US012684172B2

(12) United States Patent
Hsiang

(10) Patent No.: US 12,684,172 B2
(45) Date of Patent: *Jul. 14, 2026

(54) METHOD AND APPARATUS FOR SIGN CODING OF TRANSFORM COEFFICIENTS IN VIDEO CODING SYSTEM

(71) Applicant: MEDIATEK INC., Hsinchu City (TW)

(72) Inventor: Shih-Ta Hsiang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

This patent is subject to a terminal disclaimer.

(21) Appl. No.: 19/082,522

(22) Filed: Mar. 18, 2025

(65) Prior Publication Data

US 2025/0220239 A1 Jul. 3, 2025

Related U.S. Application Data

(63) Continuation of application No. 18/053,427, filed on Nov. 8, 2022, now Pat. No. 12,278,992.

(Continued)

(51) Int. Cl.
| | |
|---|---|
| *H04N 7/12* | (2006.01) |
| *H04N 19/11* | (2014.01) |
| *H04N 19/12* | (2014.01) |
| *H04N 19/13* | (2014.01) |
| *H04N 19/167* | (2014.01) |

(Continued)

(52) U.S. Cl.
CPC ............. *H04N 19/61* (2014.11); *H04N 19/11* (2014.11); *H04N 19/12* (2014.11); *H04N 19/13* (2014.11); *H04N 19/167* (2014.11); *H04N 19/18* (2014.11); *H04N 19/182* (2014.11); *H04N 19/186* (2014.11); *H04N 19/70* (2014.11)

(58) Field of Classification Search
CPC ...................................................... H04N 19/18
See application file for complete search history.

(56) References Cited

U.S. PATENT DOCUMENTS

| | | | |
|---|---|---|---|
| 11,595,656 B2 | 2/2023 | Chuang | |
| 12,568,248 B2 * | 3/2026 | Kim ....................... | H04N 19/61 |

(Continued)

FOREIGN PATENT DOCUMENTS

| | | |
|---|---|---|
| CN | 113316934 A | 8/2021 |

OTHER PUBLICATIONS

Chinese language office action dated Oct. 5, 2023, issued in application No. TW 111147136.

(Continued)

*Primary Examiner* — Y Lee
(74) *Attorney, Agent, or Firm* — McClure, Qualey & Rodack, LLP

(57) ABSTRACT

A method and apparatus for joint sign prediction of transform coefficients. At the encoder side, a maximum number is determined according to coding context of the current block. A set of jointly predicted coefficient signs associated with a set of selected transform coefficients is determined where a total number of the set of jointly predicted coefficient signs is equal to or smaller than the maximum number. Joint sign prediction for the set of jointly predicted coefficient signs is determined by selecting one hypothesis from a group of hypotheses corresponding to combinations of the set of jointly predicted coefficient signs that achieves a minimum cost.

18 Claims, 5 Drawing Sheets

Related U.S. Application Data

(60) Provisional application No. 63/287,606, filed on Dec. 9, 2021.

(51) Int. Cl.
 H04N 19/18 (2014.01)
 H04N 19/182 (2014.01)
 H04N 19/186 (2014.01)
 H04N 19/61 (2014.01)
 H04N 19/70 (2014.01)

(56) References Cited

U.S. PATENT DOCUMENTS

2021/0195192 A1* 6/2021 Coban .................. H04N 19/176
2026/0039873 A1* 2/2026 Xu ....................... H04N 19/597

OTHER PUBLICATIONS

Coban, M., et al.; "Algorithm description of Enhanced Compression Model 2 (ECM 2);" Joint Video Experts Team (JVET) of ITU-T SG 16 WP 3 and ISO/IEC JTC 1/SC 29; Jul. 2021; pp. 1-22.

* cited by examiner

METHOD AND APPARATUS FOR SIGN CODING OF TRANSFORM COEFFICIENTS IN VIDEO CODING SYSTEM

CROSS REFERENCE TO RELATED APPLICATIONS

The present invention is a Continuation of U.S. Utility patent application Ser. No. 18/053,427, filed on Nov. 8, 2022, which is a non-Provisional application of and claims priority to U.S. Provisional Patent Application No. 63/287, 606, filed on Dec. 9, 2021. The U.S. Provisional Patent Application is hereby incorporated by reference in its entirety.

FIELD OF THE INVENTION

The present invention relates to video coding system. In particular, the present invention relates to coding of signs of transform coefficients for residual blocks in a video coding system.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology-Coded representation of immersive media-Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an entropy decoder 140 to decode the video bitstream into quantized transform coefficients and needed coding information (e.g., ILPF information, Intra prediction information and Inter prediction information). The Intra prediction 150 at the decoder side does not need to perform the mode search. Instead, the decoder only need to generate Intra prediction according to Intra prediction information received from the Entropy Decoder 140. Furthermore, for Inter prediction, the decoder only needs to perform motion compensation (MC 152) according to Intra prediction information received from the Entropy Decoder 140 without the need for motion estimation.

In VVC, a coded picture is partitioned into non-overlapped square block regions represented by the associated coding tree units (CTUs). A coded picture can be represented by a collection of slices, each comprising an integer number of CTUs. The individual CTUs in a slice are processed in raster-scan order. A bi-predictive (B) slice may be decoded using intra prediction or inter prediction with at most two motion vectors and reference indices to predict the sample values of each block. A predictive (P) slice is decoded using intra prediction or inter prediction with at most one motion vector and reference index to predict the sample values of each block. An intra (I) slice is decoded using intra prediction only.

A CTU can be partitioned into one or multiple non-overlapped coding units (CUs) using the quatree (QT) with nested multi-type-tree (MTT) structure to adapt to various local motion and texture characteristics. A CU can be further split into smaller CUs using one of the five split types (quad-tree partitioning 210, vertical binary tree partitioning 220, horizontal binary tree partitioning 230, vertical center-side triple-tree partitioning 240, horizontal center-side triple-tree partitioning 250) illustrated in FIG. 2. FIG. 3 provides an example of a CTU recursively partitioned by QT with the nested MTT. Each CU contains one or more prediction units (PUs). The prediction unit, together with the associated CU syntax, works as a basic unit for signaling the predictor information. The specified prediction process is employed to predict the values of the associated pixel samples inside the PU. Each CU may contain one or more transform units (TUs) for representing the prediction residual blocks. A transform unit (TU) comprises of a transform block (TB) of luma samples and two corresponding transform blocks of chroma samples and each TB correspond to one residual block of samples from one color component. An integer transform is applied to a transform block. The level values of quantized coefficients together with other side information are entropy coded in the bitstream. The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU.

For achieving high compression efficiency, the context-based adaptive binary arithmetic coding (CABAC) mode, or known as regular mode, is employed for entropy coding of the values of the syntax elements in HEVC and VVC. FIG. 4 illustrates an exemplary block diagram of the CABAC process. Since the arithmetic coder in the CABAC engine can only encode the binary symbol values, the CABAC process needs to convert the values of the syntax elements into a binary string using a binarizer (410). The conversion process is commonly referred to as binarization. During the coding process, the probability models are gradually built up from the coded symbols for the different contexts. The context modeler (420) serves the modelling purpose. During normal context based coding, the regular coding engine (430) is used, which corresponds to a binary arithmetic coder. The selection of the modeling context for coding the next binary symbol can be determined by the coded information. Symbols can also be encoded without the context modeling stage and assume an equal probability distribution, commonly referred to as the bypass mode, for reduced complexity. For the bypassed symbols, a bypass coding engine (440) may be used. As shown in FIG. 4, switches (S1, S2 and S3) are used to direct the data flow between the regular CABAC mode and the bypass mode. When the regular CABAC mode is selected, the switches are flipped to the upper contacts. When the bypass mode is selected, the switches are flipped to the lower contacts as shown in FIG. 4.

In VVC, the transform coefficients may be quantized using dependent scalar quantization. The selection of one of the two quantizers is determined by a state machine with four states. The state for a current transform coefficient is determined by the state and the parity of the absolute level value for the preceding transform coefficient in a scanning order. The transform blocks are partitioned into non-overlapped sub-blocks. The transform coefficient levels in each sub-block are entropy coded using multiple sub-block coding passes. The syntax elements sig_coeff_flag, abs_level_gt1_flag, par_level_flag and abs_level_gt3_flag are all coded in the regular mode in the first sub-block coding pass. The elements abs_level_gt1_flag and abs_level_gt3_flag indicate whether the absolute value of the current coefficient level is greater than 1 and greater than 3, respectively. The syntax element par_level_flag indicates the party bit of the absolute value of the current level. The partially reconstructed absolute value of a transform coefficient level from the first pass is given by:

$$\mathrm{Abs}LevelPass1 = \mathrm{sig\_coeff\_flag} + \qquad\qquad (1)$$
$$\mathrm{par\_level\_flag} + \mathrm{abs\_level\_gt1\_flag} + 2*\mathrm{abs\_level\_gt3\_flag}.$$

The context selection for entropy coding sig_coeff_flag is dependent on the state for the current coefficient. par_level_flag is thus signaled in the first coding pass for deriving the state for the next coefficient. The syntax elements abs_remainder and coeff_sign_flag are further coded in the bypass mode in the following sub-block coding passes to indicate the remaining coefficient level values and signs, respectively. The fully reconstructed absolute value of a transform coefficient level is given by:

$$\mathrm{Abs}Level = \mathrm{Abs}LevelPass1 + 2*\mathrm{abs\_remainder}. \qquad (2)$$

The transform coefficient level is given by:

$$TransCoeffLevel = \qquad\qquad (3)$$
$$(2*\mathrm{Abs}Level - (QState > 1?\,1:0))*(1 - 2*\mathrm{coeff\_sign\_flag}),$$

where QState indicates the state for the current transform coefficient.

The present invention is intended to further improve the performance of the coding for transform coefficients of residual data in a video coding system.

BRIEF SUMMARY OF THE INVENTION

A method and apparatus of sign coding for transform coefficients of residual data in a video coding system are disclosed. According to this method, at a decoder side, coded transform coefficients corresponding to a residual block of a current block are received, where the coded transform coefficients comprise coded sign residues. An allowed maximum number is determined according to coding context associated with the current block. The coded sign residues are decoded into decoded sign residues, wherein a total number of the set of jointly predicted coefficient signs is equal to or smaller than the allowed maximum number. Joint sign prediction for the set of jointly predicted coefficient signs is determined by selecting one hypothesis from a group of hypotheses corresponding to combinations the set of jointly predicted coefficient signs that achieves a minimum cost. The costs are computed between boundary pixels of the current block and corresponding neighboring pixels of the current block for the group of hypotheses respectively, and the boundary pixels of the current block associated with each hypothesis are reconstructed using information comprising said each hypothesis. The set of jointly predicted coefficient signs are reconstructed based on the decoded sign residues and the joint sign prediction.

In one embodiment, syntax elements indicating the coding context for deriving the allowed maximum number are parsed from one or more high-level parameter sets. The high-level parameter sets comprise a sequence parameter set (SPS), a picture parameter set (PPS), a picture header, a slice header, or a combination thereof.

In one embodiment, the syntax elements are determined according to block size of the current block. For example, the allowed maximum number can be set to 4 when the block size is equal to 4×4. In another embodiment, the allowed maximum number is determined dependent on transform type of the current block.

In one embodiment, bins for the coded sign residues associated with the set of jointly predicted coefficient signs are entropy coded in a residual coding process for entropy coding of the current block. Furthermore, the residual coding process may further comprise a subblock sign coding pass for entropy coding the set of jointly predicted coefficient signs from one or more subblocks in a top-left region of the current block after one or more sub-block coding passes for entropy coding of absolute values of transform coefficient levels of said one or more subblocks.

In one embodiment, the costs are computed between boundary pixels of the current block and corresponding neighboring pixels of the current block on a top boundary of the current block only or on a left boundary of the current block only. In one embodiment, selection between the top boundary of the current block and the left boundary of the current block depends on selected Intra prediction direction of the current block.

In one embodiment, the set of jointly predicted coefficient signs is divided into a plurality of subsets where each subset includes one or more of the set of jointly predicted coefficient signs.

At the encoder side, transform coefficients corresponding to a residual block of a current block are received. An allowed maximum number is determined according to coding context associated with the current block. A set of jointly predicted coefficient signs associated with a set of selected transform coefficients is determined where a total number of the set of jointly predicted coefficient signs is equal to or smaller than the allowed maximum number. Joint sign prediction for the set of jointly predicted coefficient signs is determined by selecting one hypothesis from a group of hypotheses corresponding to combinations the set of jointly predicted coefficient signs that achieves a minimum cost. The costs are computed between boundary pixels of the current block and corresponding neighboring pixels of the current block for the group of hypotheses respectively, and the boundary pixels of the current block associated with each hypothesis are reconstructed using information comprising said each hypothesis. Sign residues between the set of jointly predicted coefficient signs and the joint sign prediction are determined. Context coding is applied to the sign residues to generate coded sign residues.

DETAILED DESCRIPTION OF THE INVENTION

Figure 1A:
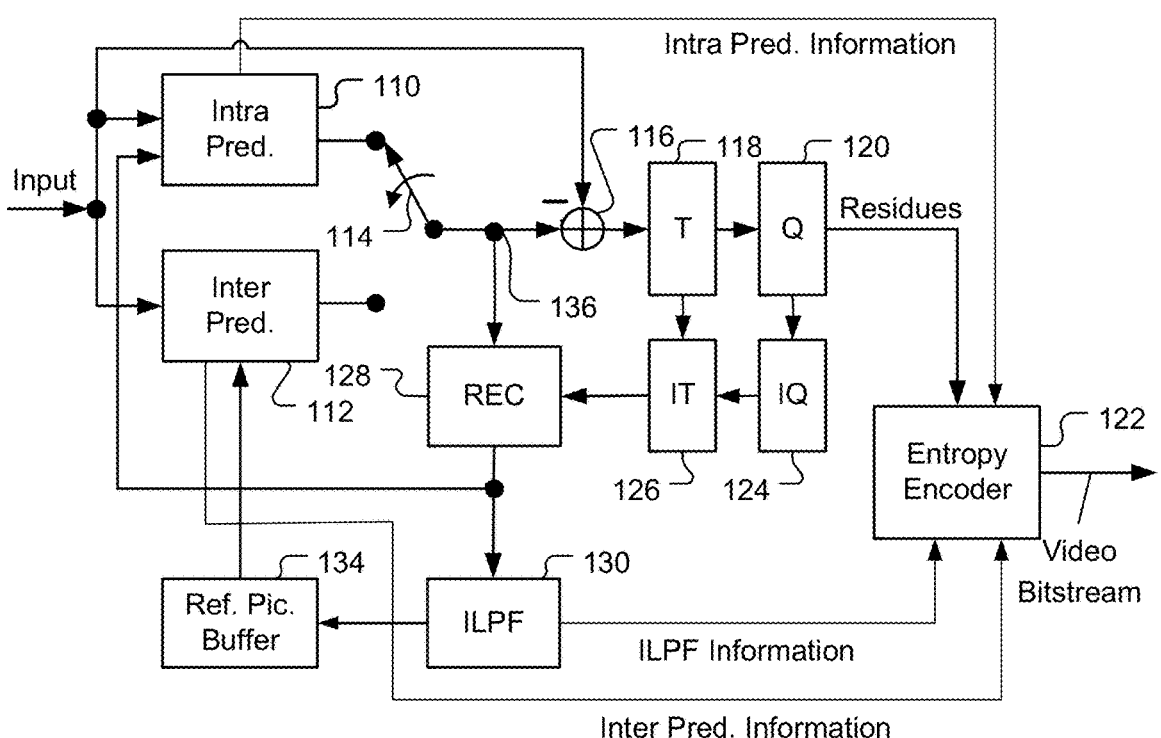
FIG. 1A illustrates an exemplary adaptive Inter/Intra video coding system incorporating loop processing.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Joint Video Expert Team (JVET) of ITU-T SG16 WP3 and ISO/IEC JTC1/SC29/WG11 are currently in the process of exploring the next-generation video coding standard. Some promising new coding tools have been adopted into Enhanced Compression Model 2 (ECM 2) (M. Coban, et al., "Algorithm description of Enhanced Compression Model 2 (ECM 2)," Joint Video Expert Team (JVET) of ITU-T SG 16 WP 3 and ISO/IEC JTC 1/SC 29, 23rd Meeting, by teleconference, 7-16 Jul. 2021, Doc. JVET-W2025) to further improve VVC. The adopted new tools have been implemented in the reference software ECM-2.0 (ECM reference software ECM-2.0, available at https://vcgit.hhi.fraunhofer.de/ecm/ECM [Online]). Particularly, a new method for jointly predicting a collection of signs of transform coefficient levels in a residual transform block has been developed (JVET-D0031, Felix Henry, et al., "Residual Coefficient Sign Prediction", Joint Video Expert Team (JVET) of ITU-T SG 16 WP 3 and ISO/IEC JTC 1/SC 29, 4th Meeting: Chengdu, CN, 15-21 Oct. 2016, Doc. JVET-D0031). In ECM 2, to derive a best sign prediction hypothesis for a residual transform block, a cost function is defined as discontinuity measure across block boundaries shown on FIG. 5, where block 510 corresponds to a transform block, circles 520 correspond to neighboring samples and circles 530 correspond to reconstructed samples associated with sign candidates of block 510. The cost function is defined as a sum of absolute second derivatives in the residual domain for the above row and left column as follows:

$$\text{cost} = \sum_{x=0}^{w-1} |(-R_{x,-2} + 2R_{x,-1} - P_{x,0}) - r_{x,0}| + \tag{4}$$

$$\sum_{y=0}^{h-1} |(-R_{-2,y} + 2R_{-1,y} - P_{0,y}) - r_{0,y}|$$

In the above equation, R is reconstructed neighbors, P is prediction of the current block, and r is the residual hypothesis. The allowed maximum number of the predicted signs $N_{sp}$ for each sign prediction hypothesis in a transform block is signaled in the sequence parameter set (SPS) and is constrained to be less than or equal to 8 in ECM-2.0. The cost function is measured for all hypotheses, and the one with the smallest cost is selected as a predictor for coefficient signs. Only signs of coefficients from the top-left 4×4 transform subblock region (with lowest frequency coefficients) in a transform block are allowed to be included into the hypothesis. The signs of first $N_{sp}$ non-zero coefficients (if available) are collected and coded according to a raster-scan order over the top-left 4×4 subblock. For those predicted coefficients, instead of the coefficient sign, a sign prediction bin indicating whether the predicted sign is equal to the selected hypothesis is signaled. This sign prediction bin is context coded, where the selected context is derived from whether a coefficient is DC or not. The contexts are separated for intra and inter blocks, and for luma and chroma components. For those other coefficients without sign prediction, the corresponding signs are coded by CABAC in the bypass mode.

According to one aspect of the present invention, context modeling for entropy coding the sign prediction bin of a current coefficient may be further conditioned on information about the absolute value of the current transform coefficient level. It is due to the fact that the coefficients with larger absolute level values have higher impacts on the output values of the cost function and therefore tend to have higher correct prediction rate. In the proposed method, the process of a video coder comprises employing a plurality of context variables for coding the syntax information related to the signs of the transform coefficient levels associated with sign prediction, wherein the selection of a context variable for coding the sign of a current coefficient level may further depend on the absolute value of the current transform coefficient level. In some embodiments, context selection for entropy coding of sign prediction bins of certain coefficients is further dependent on whether the absolute value of the current transform coefficient level is greater or less than one or more thresholds. In one example, context selection for entropy coding of the sign prediction bins of certain coefficients is further dependent on whether the absolute value of the current transform coefficient level is greater than a first threshold T1. In some preferred embodiments, T1 can be equal to 1, 2, 3, or 4. In another example, the context selection for entropy coding of the sign prediction bins of certain coefficients is further dependent on whether the absolute value of the current transform coefficient level is greater than a second threshold T2, wherein T2 is greater than T1. In some preferred embodiments, (T1, T2) can be equal to (1, 2), (1, 3), or (2, 4).

According to one further aspect of the present invention, the process for a video coder may further comprise setting the values of the said one or more thresholds adaptively considering the coding context for the current transform block. In some embodiments, the derivation of the one or more thresholds may further depend on the transform block dimension, transform type, color component index, number of the predicted signs, number of the non-zero coefficients, or position of the last significant coefficient associated with the current transform block. The derivation of the one or more thresholds may further depend on the prediction mode of the current CU. The derivation of the one or more thresholds may further depend on the position or index associated with a current coefficient in a transform block. The derivation of the one or more thresholds may further depend on the sum of the absolute values of the coefficients subject to sign prediction in the current transform block.

According to another aspect of the present invention, context modeling for entropy coding of the sign prediction bin of a current coefficient may be further conditioned on the derived information from the absolute values of the current coefficient level and other coefficient levels in a current transform block. In some embodiments, the context selection for entropy coding of the sign of a coefficient in a current transform block may be further dependent on the sum of the absolute values of the coefficients subject to sign prediction in the current transform block. In some embodiments, the context selection for entropy coding of the sign of a coefficient in a current transform block may be further dependent on the absolute value of the next coefficient subject to sign prediction or the sum of the absolute values of the remaining coefficients subject to sign prediction in the current transform block.

In some of the proposed embodiments, the context selection dependent on the absolute coefficient level may only be employed by a specified plurality of transform coefficients. The context selection for a current coefficient is independent of the absolute coefficient level when the current coefficient does not belong to the specified plurality of transform coefficients. In some embodiments, the specified plurality of transform coefficients correspond to the first N1 coefficients associated with sign prediction according to a pre-defined scan order in a transform block. The context selection is independent of the absolute coefficient level when a current coefficient does not belong to the first N1 coefficients. In some embodiments, the pre-defined order is the order for entropy coding of the sign prediction bins. In some embodiments, N1 is equal to 1, 2, 3, or 4. In some embodiments, the specified group of transform coefficients correspond to the coefficients from a transform coefficient region or scan index range.

In some embodiments, the specified group of transform coefficients correspond to a DC coefficient in a transform block. The context selection for sign coding may depend on the absolute value of a current transform coefficient level when a current transform coefficient is a DC coefficient. The context selection for sign coding is independent of the absolute value of a current transform coefficient level, otherwise. In some embodiments, the specified plurality of transform coefficients are from luma blocks only. The context selection for sign coding may be dependent on the absolute value of a current transform coefficient level in a luma TB and is independent of the absolute value of a current transform coefficient level in a chroma TB. In some embodiments, the specified plurality of transform coefficients are only associated with some particular transform block dimensions, transform types, or CU coding modes.

According to another aspect of the present invention, context modeling for entropy coding of the sign prediction bin of a current coefficient may be further conditioned on the information about the coded sign prediction bins in the current transform block. In some embodiments, the context selection for entropy coding of the sign prediction bins of certain coefficients may further depend on whether the first coded sign prediction or the DC sign prediction in the current transform block is correct. In some embodiments, the context selection for entropy coding of the sign of a current coefficient may further depend on the accumulated number of the sign prediction bins corresponding to incorrect sign prediction. In some embodiments, the context selection for entropy coding of the sign prediction bins of certain coefficients is dependent on whether the accumulated number of the sign prediction bins corresponding to incorrect sign prediction is greater than one or more specified threshold values. In one embodiment, context selection for entropy coding of the sign prediction bins of certain coefficients is dependent on whether the accumulated number of the sign prediction bins corresponding to incorrect sign prediction is greater than $T_{ic}$, wherein $T_{ic}$ is equal to 0, 1, 2 or 3. According to another aspect of the present invention, entropy coding of the remaining sign prediction bins may be switched to the bypass mode when the accumulated number of the coded sign prediction bins corresponding to incorrect sign prediction is greater than a specified threshold.

According to another aspect of the present invention, context modeling for entropy coding of the sign prediction bin of a current coefficient may be further conditioned on the total number of the sign prediction bins in the current transform block. In some embodiments, the context selection for entropy coding of the sign prediction bins of certain coefficients in a current transform block may be further dependent on whether the total number of the sign prediction bins in the current transform block is greater than one or more non-zero threshold values. According to one further aspect of the present invention, the process for a video coder may further comprise setting the values of the said one or more thresholds adaptively considering the coding context for the current transform block. In some embodiments, the derivation of the one or more thresholds may further depend on the transform block dimension, transform type, color component index, position of the last significant coefficient, or number of the non-zero coefficients associated with the current transform block. The derivation of the one or more thresholds may further depend on the prediction mode of the current CU. The derivation of the one or more thresholds may further depend on the absolute level, position or index associated with a current coefficient in a transform block. The derivation of the one or more thresholds may further depend on the sum of the absolute values of the coefficients subject to sign prediction in the current transform block.

Figure 6:
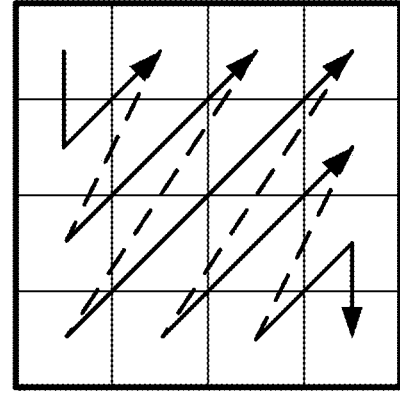
FIG. 6 illustrates an example of collecting the signs of first $N_{sp}$ coefficients in a forward subblock-wise diagonal scan order starting from the DC coefficient according to one embodiment of the present invention.

According to another aspect of the present invention, context modeling for entropy coding of the sign prediction bin of a current coefficient may be further conditioned on information about the index or position of the current transform coefficient in a transform block, wherein the index of the current transform coefficient may correspond to the scan order for coding predicted signs, or may be derived according to a raster-scan order, a diagonal scan order (as shown in FIG. 6), or the sorted order related to the absolute value of the coefficient levels in the current transform block. In some embodiments, the context selection for entropy coding of the sign prediction bins of certain coefficients is dependent on whether the index of the current transform coefficient level is greater or less than one or more non-zero threshold values.

In some other embodiments, the context selection for entropy coding of the sign prediction bins of certain coefficients is dependent on whether the distance between the top-left block origin at position (0, 0) and the current coefficient position (x, y) is greater or less than another one or more non-zero threshold values, where the distance is defined as (x+y). According to one further aspect of the present invention, the process for a video coder may further comprise setting the values of the said one or more thresholds or another one or more non-zero thresholds adaptively considering the coding context for the current transform block. In some embodiments, the derivation of the said one or more thresholds or another one or more non-zero threshold may further depend on the transform block dimension, transform type, color component index, number of the predicted signs, number of the non-zero coefficients, or position of the last significant coefficient associated with the current transform block. The derivation of the said one or more thresholds or another one or more non-zero threshold may further depend on the prediction mode of the current CU. The derivation of the one or more thresholds may further depend on the absolute level associated with the current coefficient or further depend on the sum of the absolute values of the coefficients subject to sign prediction in the current transform block.

According to another aspect of the present invention, context modeling for entropy coding of the sign prediction bin of a current coefficient in a current transform block may be further conditioned on the width, height or block size of the current transform block. In some embodiments, the context selection for entropy coding of the sign prediction bins of certain coefficients in a current transform block is dependent on whether the width, height or block size of the current transform block is greater or less than one or more threshold values.

According to another aspect of the present invention, context modeling for entropy coding of the sign prediction bin of a current coefficient in a current transform block may be further conditioned on the transform type associated with the current transform block. In some embodiments, the context selection for entropy coding of the sign prediction bins of certain coefficients in a current transform block may further depend on the transform type associated with the current transform block. In some exemplary embodiment, a video coder may assign a separate set of contexts for entropy coding of the sign prediction bins of certain transform coefficients in a current transform block when the current block transform type belongs to low-frequency non-separable transform (LFNST) or multiple transform selection (MTS).

At a decoder side, corresponding cost functions are evaluated for possible hypotheses as disclosed in JVET-D0031. The decoder will parse coefficients, signs and sign residues as part of its parsing process. The signs and sign residues are parsed at the end of the TU, and at that time the decoder knows the absolute values of all coefficients. Thus it can determine what signs are predicted and, for each predicted sign, it can determine the context used to parse the sign prediction residue based on the dequantized coefficient value. The knowledge of a "correct" or "incorrect" prediction is simply stored as part of the CU data of the block being parsed. The real sign of the coefficient is not known at this point. During reconstruction, the decoder performs operations similar to the encoder to determine hypothesis costs. The hypothesis that achieves the minimum cost is determined as the sign prediction.

In ECM-2.0, the signs of first $N_{sp}$ non-zero coefficients (when available) are collected and coded according to a forward raster-scan order over the top-left 4×4 sub-block in a current transform block when sign prediction is applied to the current transform block. The number of all possible hypotheses subject to discontinuity measure is equal to $1<<N_{sp}$ and significantly increases with the number of the predicted signs, where "<<" is a bit-wise up-shift operator. In one proposed method, a video coder may comprise a constraint on the minimum absolute value of a transform coefficient level applicable for sign prediction, wherein the minimum absolute value may be greater than 1 for certain specified transform coefficients. The sign of a current coefficient under the constraint is allowed to be included into a hypothesis for sign prediction only when the absolute value of the current transform coefficient level is greater than or equal to the specified minimum value. In this way, those coefficients with lower amplitude can be excluded for sign prediction and the number of the predicted signs in a transform block can be reduced.

In some embodiments, the sign of a current coefficient is allowed to be included into the hypothesis for sign prediction only when the absolute value of the current coefficient level is greater than a specified threshold $T_{sp}$, wherein $T_{sp}$ is greater than 0 for certain specified coefficients from the TB region subject to sign prediction (the top-left 4×4 sub-block in ECM-2.0). In one embodiment, the sign of a current coefficient is allowed to be included into the hypothesis for sign prediction only when the absolute value of the current coefficient level is greater than 1 for certain specified coefficients. The proposed method may further comprise determining the value of $T_{sp}$ adaptively. In one example, $T_{sp}$ can be adaptively derived according to the block width, height or size of the current transforms block. In another example, $T_{sp}$ can be adaptively derived according to the selected quantization parameter for the current transform block. For another example, $T_{sp}$ can be adaptively derived according to the position or index of the current coefficient in a current block. In one exemplary embodiments, $T_{sp}$ can be derived as follows:

When the index of a current coefficient is less than C1, $T_{sp}$ is equal to 0;

Otherwise, when the index of a current coefficient is less than C2, $T_{sp}$ is equal to 1;

Otherwise, $T_{sp}$ is equal to 2, wherein $0 \leq C1 < C2 \leq N_{sp}$.

In ECM-2.0, when sign prediction is applied to a current transform block, signs of first $N_{sp}$ non-zero coefficients (if available) are collected and coded according to a raster-scan order over the top-left 4×4 sub-block. The transform coefficient region applicable for sign prediction is fixed to be the top-left 4×4 sub-block for each transform block. In the proposed method, the process for a video coder may further comprise adaptively setting the transform coefficient region or index range applicable for sign prediction in a current transform block according to the coding context associated with the current transform block. The video coder may comprise a specified scan order for collecting the signs of first $N_{sp}$ coefficients in a transform block. The video coder may further comprise determining a largest index applicable for sign prediction in a current transform block according to the specified scan order, wherein the sign of any transform coefficient with an index greater than the largest index according to the specified scan order in the current transform is not applicable for sign prediction.

Alternatively, the video coder may comprise determining whether a transform coefficient or subblock is applicable for sign prediction in a current transform block dependent on the position (x, y) of the transform coefficient or subblock in the current transform block and one or more specified thresholds, wherein the top-left block origin of the current transform block corresponds to the position (0, 0). In some embodiments, a transform coefficient or subblock at position (x, y) is applicable for sign prediction only when x is less than a first threshold and y is less than a second threshold in certain transform blocks. In some other embodiments, a transform coefficient or subblock at position (x, y) is applicable for sign prediction only when the distance between the transform block origin and the position of the current coefficient or subblock equal to (x+y) is less than another specified threshold in certain transform blocks.

In some embodiments, the transform coefficient region or index range applicable for sign prediction in a current transform block may be adaptively set dependent on the block dimension, transform type, color component index, position of the last significant coefficient, or number of the non-zero coefficients associated with the current transform block. In some embodiments, a video coder may reduce the transform coefficient region or index range applicable for sign prediction in a current transform block when the width or height of the current transform block is less than one specified threshold or the size of the current transform block is less than another specified threshold. In some exemplary embodiments, the transform coefficient index range applicable for sign prediction may be set to be from 0 to $R1_{sp}$ for transform blocks with block width or height less than one threshold $M_{sp}$ or for transform blocks with block size less than another threshold $MN_{sp}$, wherein $R1_{sp}$ is a largest index according to the specified scan order. In some embodiments, $R1_{sp}$ may be equal to 2, 3, 5, or 7 when $M_{sp}$ is equal to 4, 8, 16, or 32, or when $MN_{sp}$ is equal to 16, 64, 256, or 1028. It should be noted that the values of $R1_{sp}$, $M_{sp}$ and $MN_{sp}$ mentioned above are for exemplary purpose only, other suitable values may be selected or determined upon the need.

In some embodiments, a video coder may enlarge the transform coefficient region or index range applicable for sign prediction when the width or height of the current transform block is greater than one specified threshold or the size of the current transform block is greater than another specified threshold.

In some exemplary embodiments, a video coder may include more than one subblock from the low-frequency transform block region when the width or height of the current transform block is greater than one specified threshold or the size of the current transform block is greater than another specified threshold. In some embodiments, a video coder may reduce the transform coefficient region or index range applicable for sign prediction for one or more specified transform types. In some exemplary embodiments, the transform coefficient index range applicable for sign prediction are set to be from 0 to $R2_{sp}$ for one or more specified transform types, wherein $R2_{sp}$ is the largest index according to the specified scan order.

In some other exemplary embodiments, a transform coefficient at position (x, y) is applicable for sign prediction only when the distance between the transform block origin and the position of the current coefficient equal to (x+y) is less than another specified threshold DI sp. In some embodiments, one or more specified transform types comprise certain low-frequency non-separable transform (LFNST) types and/or certain transform types associated with multiple transform selection (MTS), $R2_{sp}$ may be equal to 2, 3, 5, or 7, and $DI_{sp}$ may be equal to 1, 2, 3, 4, 5, 6, or 7. In some embodiments, the transform coefficient region or index range applicable for sign prediction is reduced for certain MTS and/or LFNST types compared to that for DCT type II. In some embodiments, a video coder may enlarge the transform coefficient region or index range applicable for sign prediction for one or more specified transform types. In some exemplary embodiments, a video coder may include more than one subblock from the low-frequency transform block region when the transform type associated with a current residual block belongs to one or more specified transform types. In some embodiments, one or more specified transform types comprise DCT type II.

The proposed method may further comprise signaling information about the transform coefficient region or index range applicable for sign prediction in the bitstream. In some embodiments, a video coder may signal one or more syntax elements for deriving the transform coefficient region or index range applicable for sign prediction in one or more high-level parameter sets such as sequence parameter set (SPS), picture parameter set (PPS), picture header (PH) and/or slice header (SH).

In some other embodiments, a video coder may signal more than one syntax set for deriving information about more than one transform coefficient region or index ranges for sign prediction in one or more of the high-level syntax sets, wherein each syntax set corresponds to information on deriving a particular transform coefficient region or index range applicable for sign prediction for certain specified transform blocks and the selection of a particular transform coefficient region or index range for a current transform block is determined dependent on the coding context associated with the current transform block. For example, the selection of a particular transform coefficient region or index range for a current transform block may be dependent on the transform block size, transform type, color component index, number of the predicted signs, position of the last significant coefficient or the number of non-zero coefficients associated with the current transform block. The selection of particular transform coefficient region or index range for a current transform block may also be dependent on the prediction mode of the current CU.

In ECM-2.0, the allowed maximum number of the predicted signs $N_{sp}$ in a transform block is signaled in the sequence parameter set (SPS) and $N_{sp}$ is constrained to be less than or equal to 8. In the proposed method, a video coder may adaptively set the allowed maximum number of the predicted signs in a current transform block according to the coding context associated with the current transform block. In some embodiments, a video coder may adaptively derive the allowed maximum number of the predicted signs in a current transform block from one or more referred syntax values based on the coding context associated with the current transform block. In some embodiments, the derivation of the allowed maximum number of the predicted signs in a current transform block is dependent on the transform block dimension, transform type, color component index, position of the last significant coefficient, or number of the non-zero coefficients associated with the current transform block. For example, the allowed maximum number can be set to 4 for a smaller transform block size, such as 4×4, when the reference syntax value $N_{sp}$ specified in the high-level syntax set is greater than 4. In one example, the allowed maximum number of the predicted signs in a current transform block is set equal to the reference syntax value $N_{sp}$ multiplied by a scaling factor, wherein the selection of a scaling factor value is dependent on the current block dimension.

In some other embodiments, a video coder may signal more than one syntax set in one or more high-level parameter sets such as sequence parameter set (SPS), picture parameter set (PPS), picture header (PH) and/or slice header (SH), wherein each syntax set corresponds to information on deriving a particular parameter value of the allowed maximum number of the predicted signs in a transform block for certain specified transform blocks. Furthermore, the selection of a particular parameter value for the allowed maximum number of the predicted signs in the current transform block is dependent on the current coding context. For example, the selection of a particular parameter value for the allowed maximum number of the predicted signs in a current transform block may be dependent on the transform block dimension, transform type, color component index, position of the last significant coefficient, or number of the non-zero coefficients associated with the current transform block. In one embodiment, the selection of a particular parameter value for the allowed maximum number of the predicted signs in a current transform block may be determined by comparing the current block size with one or more predefined thresholds. In another embodiment, the selection of a particular parameter value is determined by whether or not a secondary transform such as LFNST is applied to the current transform block. The selection of a particular parameter value for a current transform block may also be dependent on the prediction mode of the current CU. In the proposed method, the process for a video coder may further comprise more than one upper-limit constraints, each constraint limits the max parameter value of the allowed maximum number of the predicted signs in a transform block for certain specified transform blocks. The determination of the upper-limit constraint for a current transform block may be dependent on the transform block dimension, transform type, color component index, position of the last significant coefficient, or number of the non-zero coefficients associated with the current transform block. In one embodiment, the upper-limit constraint is set equal to 4 for transform blocks having block size less than or equal to 16.

In ECM-2.0, the coefficient sign prediction tool is disabled for a current transform block when the transform block width or height of the current transform block is greater than 128 or less than 4. According to one aspect of the present invention, a video coder may adopt different constraints on block dimension for enabling sign prediction for different transform types. In the proposed method, the video coder comprises more than one set of dimension constraints for enabling sign prediction for different transform types. The video coder further comprises determining the selected set of dimension constraints for enabling sign prediction in a current transform block dependent on the current transform type. In some embodiments, a video coder may select the set including a lower value of the maximum dimension constraint for one or more transform types belonging to MTS and/or LFNST types than that for DCT type II.

In ECM-2.0, the signs of first $N_{sp}$ non-zero coefficients are collected and coded according to a forward raster-scan order over the first sub-block for sign prediction. According to another aspect of the present invention, a video coder may determine the selected first $N_{sp}$ coefficients subject to sign prediction according to the order of decreasing coefficient amplitude based on the expected distribution of transform coefficient levels. In one embodiment, the signs of first $N_{sp}$ coefficients are collected according to a forward subblock-wise diagonal scan order starting from the DC coefficient, wherein transform coefficients in each subblock are visited in diagonal scan order as shown in FIG. 6 and subblocks in each transform block are also visited in diagonal scan order. In another embodiment, the signs of first $N_{sp}$ coefficients are collected and coded according to a forward subblock-wise diagonal scan order. In another embodiment, the signs of first $N_{sp}$ coefficients are collected in a forward subblock-wise diagonal scan order and coded in a backward subblock-wise diagonal scan order.

In ECM-2.0, a best sign prediction hypothesis is determined for a current transform block by minimizing a cost function corresponding to discontinuity measure by the sum of the absolute differences (SAD) across the block boundaries. In the proposed method, a best sign prediction hypothesis is determined for a current transform block by minimizing a cost function corresponding to discontinuity measure by the sum of the squared error across the block boundaries, as follows:

$$\text{cost} = \sum\nolimits_{x=o}^{w-1} ((-R_{x,-2} + 2R_{x,-1} - P_{x,0}) - r_{x,0})^2 + \qquad (5)$$

$$\sum\nolimits_{y=o}^{h-1} ((-R_{-2,y} + 2R_{-1,y} - P_{0,y}) - r_{0,y})^2.$$

In ECM-2.0, when sign prediction is enabled for a current transform block, the top-left (lowest-frequency) transform subblock is applicable for sign prediction and sign coding is skipped for the top-left transform subblock during the residual coding process for entropy coding of the current transform block. After entropy coding all the transform blocks (by the residual coding process individually) and the syntax elements for indicating LFNST and MTS indices associated with a current CU, a separate sign coding process is utilized for entropy coding sign information on the first transform subblock for each of the residual blocks with sign prediction enabled in the current CU. In this way, each of transform blocks enabled for sign prediction in a current CU needs to be revisited for sign coding after entropy coding each of transform blocks by the residual coding process.

In the proposed method, a video coding system comprises entropy coding a plurality of residual blocks in a current CU, wherein each of the plurality of residual blocks is coded by a residual coding process. The sign prediction bins in a current transform block are also entropy coded in the residual coding process for entropy coding of the current transform block. Each coded sign prediction bin for a current coefficient indicates whether the predicted sign for the current coefficient is correct or not. The separate sign coding process in ECM-2.0 is removed. In some embodiments, each residual block is divided into one or more non-overlapped subblocks and the residual coding process comprises entropy coding individual subblocks in a current transform block according to a specified subblock scan order. The residual coding process may further comprise one or more subblock coding passes for entropy coding information about the absolute values of the transform coefficient levels in a current subblock. The residual coding process may further comprise determining the collection of coefficients subject to sign prediction in the current transform block based on a specified rule. The residual coding process may further comprise entropy coding sign prediction bins in the current transform block according to a specified scan order.

In some embodiments, sign prediction is only applicable for the transform coefficients from the top-left transform subblock in each transform block. The residual coding process may further comprise a subblock sign coding pass for entropy coding coefficient sign information according to a specified scan order in the top-left subblock after one or more sub-block coding passes for entropy coding of the absolute values of the transform coefficient levels in the top-left subblock. In the subblock sign coding pass, a syntax flag may be signaled for a current non-zero coefficient in the top-left subblock. When the current non-zero coefficient is subject to sign prediction, the syntax flag signals the value of a sign prediction bin to indicate whether sign prediction for the current coefficient is correct. Otherwise, the syntax flag signals the sign of the current non-zero coefficient. In some embodiments, the sub-block sign coding pass for entropy coding sign information follows a backward diagonal scan order in the top-left subblock. In some other embodiments, the sub-block sign coding pass for entropy coding sign information follows a forward diagonal scan order in the top-left subblock. The context modeling for entropy coding of the sign prediction bins may be further conditioned on the coded sign prediction bins. In some embodiments, sign prediction is applicable for the transform coefficients from more than one subblock from the top-left transform block region in a transform block. The proposed subblock sign coding pass can be similarly applied to each subblock from the top-left transform block region subject to sign prediction.

Figure 5:
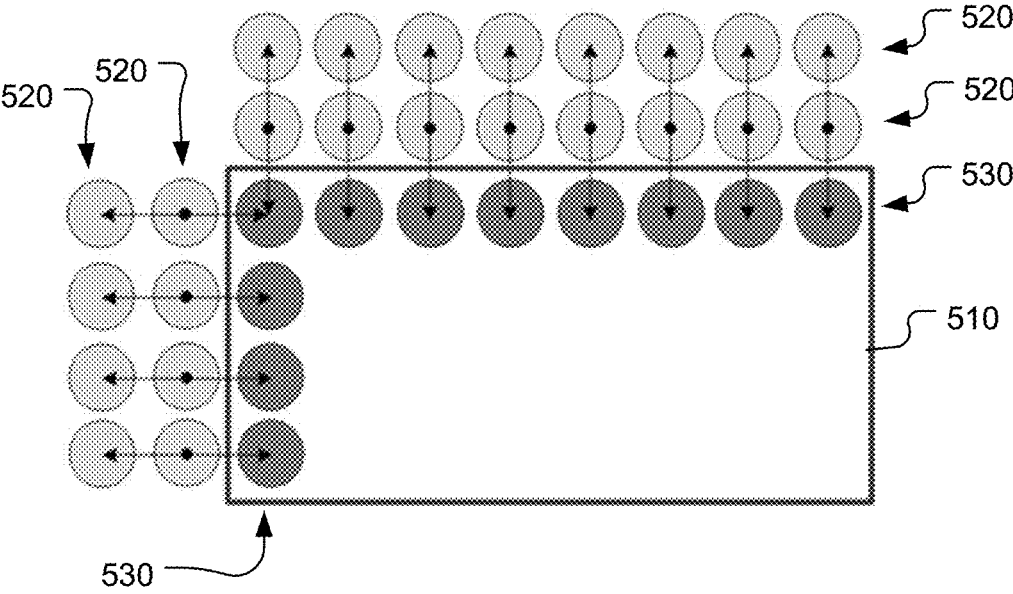
FIG. 5 illustrates the cost function calculation to derive a best sign prediction hypothesis for a residual transform block according to Enhanced Compression Model 2 (ECM 2).

In ECM-2.0, a best sign prediction hypothesis is determined in a current transform block by minimizing a cost function corresponding to discontinuity measure across the left block boundary and the above block boundary, as illustrated in FIG. 5. According to another aspect of the present invention, a video coder may only employ one side of block boundary samples, either left or above, to derive the predicted signs or turn off sign prediction entirely considering the coding context associated with the current transform block. In the proposed method, a video coder comprises one sign prediction mode corresponding to deriving the predicted signs in a transform block based on the discontinuity measure across both the above block boundary and the left block boundary. The video coder further comprises two additional sign prediction modes, wherein a first additional mode corresponds to deriving the predicted signs in a transform block based on the discontinuity measure across the left block boundary only, and a second additional mode corresponds to deriving the predicted signs in a transform block based on the discontinuity measure across the above block boundary only. In some embodiments, the cost functions correspond to the first additional mode and the second additional mode are given by Eqns. (6) and (7), respectively, as follows:

$$\text{cost} = \sum\nolimits_{y=0}^{h-1} |(-R_{-2,y} + 2R_{-1,y} - P_{0,y}) - r_{0,y}| \qquad (6)$$

$$\text{cost} = \sum\nolimits_{x=o}^{w-1} |(-R_{x,-2} + 2R_{x,-1} - P_{x,0}) - r_{x,0}| \qquad (7)$$

The video coder further comprises determining the selected sign prediction mode for a current transform block. The video coder may determine the selected sign prediction mode based on the luma component only for all transform blocks in a CU. In some embodiments, a video coder may derive the selected sign prediction mode in a current transform block considering the selected intra prediction direction in the current CU. In one example, a video coder may set the selected sign prediction mode to be the first additional prediction mode when the selected intra prediction direction is close to the horizontal prediction direction, and set the selected sign prediction mode to be the second additional prediction mode when the selected intra prediction direction is close to the vertical prediction direction.

In some other embodiments, a video coder may derive the selected sign prediction mode in a current transform block considering the block boundary conditions associated with the current block. For example, when one particular current block boundary is overlapped with a tile or slice boundary, a video coder may determine not to employ the reconstructed samples from this particular boundary for deriving the predicted signs. When reconstructed neighboring samples are not available across both above and left block boundaries, the video coder may disable sign prediction for this block. For another example, when it is determined from the reconstructed boundary samples that an image edge may be present across one particular current block boundary, a video coder may determine not to employ the reconstructed samples from this particular boundary for deriving the predicted signs.

In some other embodiments, a video coder may signal one or more syntax elements for deriving the selected sign prediction mode in a current transform block or coding unit when residual signal is present in the current transform block or coding unit. In some embodiments, the video coder may signal one or more syntax elements for deriving the selected sign prediction mode in a current transform block only when the number of predicted signs in the current transform block is greater than a threshold.

In some embodiments, a video coder may down-sample the left block boundary vertically and the above block boundary horizontally in the cost function for discontinuity measure at reduced computational complexity. In the proposed embodiments, the down-sampling ratio for the selected block boundary can be reduced by 2 when only one of the two additional prediction modes is selected for a current transform block.

In ECM-2.0, when sign prediction is applied to the current transform block, a set of signs of up to $N_{sp}$ coefficients in a current transform blocks are jointly predicted by minimization of the cost function Eqn. (1). The number of all possible hypotheses subject to discontinuity measure is equal to $1 << N_{sp}$ and increases significantly with the number of the signs to be predicted jointly. According to another aspect of the present invention, the set of signs subject to sign prediction in a transform block may be predicted in subsets to lower the number of all possible hypotheses subject to discontinuity measure. The set of signs subject to sign prediction jointly is referred as a set of jointly predicted coefficient signs. In the proposed method, the set of the signs subject to sign prediction in a transform block may be divided into one or more subsets of signs. Predicting and coding the set of the signs subject to sign prediction comprise predicting and coding each subset of signs, wherein the signs in each subset are jointly predicted by minimization of a cost function, such as Eqn. (1) as an example, over all possible hypotheses for each subset. The derived signs from the coded subsets can be utilized for the reconstruction of the boundary samples in the current transform block for predicting the signs of the current subset. By dividing the set of signs subject to sign prediction into subsets, the allowed maximum number of predicted signs in a transform block may be further increased to 8.

In some embodiments, a video coder may employ a same subset size, $S_{sp}$, for uniformly dividing the set of signs into one or more subsets with subset size all equal to $S_{sp}$, except for one subset that may have the subset size equal to the remainder of the set size after division by $S_{sp}$. In some embodiments, the value of $S_{sp}$ may be equal to 1, 2, 3, 4, 5, 6, 7, or 8, or is signaled in the bitstream. In some other embodiments, a video coder may set the subset size $S_{sp}$ adaptively. For example, $S_{sp}$ may be adaptively determined depending on the transform block dimension, transform type, color component index, number of the non-zero coefficients or number of the predicted signs associated with the current transform block. $S_{sp}$ can also be adaptively adjusted considering the prediction mode of the current CU. In some embodiments, sign prediction may be skipped for a subset and all the signs in the subset are coded in the bypass mode. For example, a video coder may skip sign prediction for a subset in a current transform block, wherein the subset is not the first subset in a current transform block and the number of predicted signs or nonzero coefficients in the subset is less than $S_{sp}$ or other specified threshold.

According to a another aspect of the present invention, a video coder may divide the set of signs subject to sign prediction in a transform block into subsets of different sizes. For example, $S^{(i)}_{sp}$ can be used to indicate the subset size for subset i. In one example, the subset size $S^{(i)}_{sp}$ is equal to 2, 2, and 4, for i equal to 0, 1, and 2, respectively, when up to 8 signs are subject to sign prediction in a transform block. In another example, the subset size $S^{(i)}_{sp}$ is equal to 2, 2, 4, and 8 for i equal to 0, 1, 2, and 3, respectively, when up to 16 signs are subject to sign prediction in a transform block. In another example, the subset size $S^{(i)}_{sp}$ is equal to 1, 2, 3, 4, and 6 for i equal to 0, 1, 2, 3, and 4, respectively, when up to 16 signs are subject to sign prediction in a transform block.

In some embodiments, a video coder may determine the associated subset index for sign prediction for a current transform coefficient according to the position or scan index of the current transform coefficient in the current transform block. For example, when the scan index of a current coefficient is greater than a specified threshold $T_{sub}$, the associated subset index is set equal to 1; otherwise, the associated subset index is set equal to 0. In some embodiments, $T_{sub}$ is equal to 0, 1, 2, 3, 4, or 5.

In some embodiments, a video coder may adaptively divide the set of signs subject to sign prediction into subsets in a current transform block depending on the transform block dimension, transform type, color component index, number of the non-zero coefficients or number of the predicted signs associated with the current transform block. In some other embodiments, a video coder may adaptively divide the set of signs subject to sign prediction into subsets depending on the prediction mode of the current CU. In some other embodiments, a video coder may determine the division of the set of signs subject to sign prediction into subsets of variable size in a current transform block adaptively considering the absolute values of coefficient levels in the current transform block.

In some embodiments, the information about dividing the set of signs subject to sign prediction into subsets can be signaled in the bitstream. In some specific embodiments, the information about dividing the set of signs subject to sign prediction into subsets may be signaled in the sequence parameter set (SPS), picture parameter set (PPS), picture header (PH) and/or slice header (SH). In some embodiments, context modeling for entropy coding the sign of a current coefficient associated with sign prediction may be further conditioned on information derived from division of the set of signs subject to sign prediction into subsets. In some embodiments, the context selection for entropy coding of the sign of a current transform coefficient in a subset may be further dependent on the subset index associated with the subset.

Figure 1B:
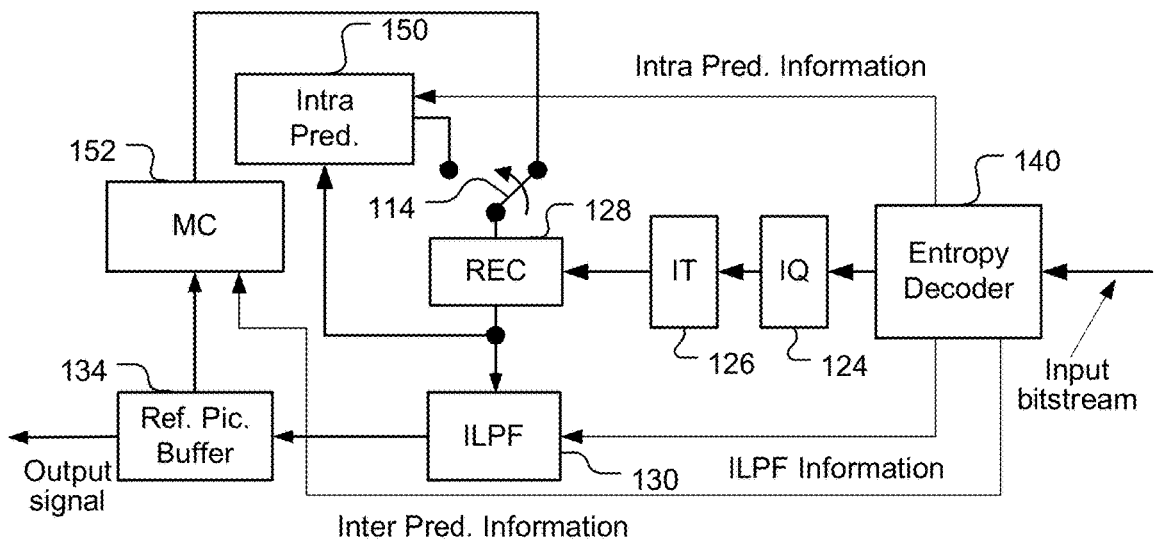
FIG. 1B illustrates a corresponding decoder for the encoder in FIG. 1A.
Figure 2:
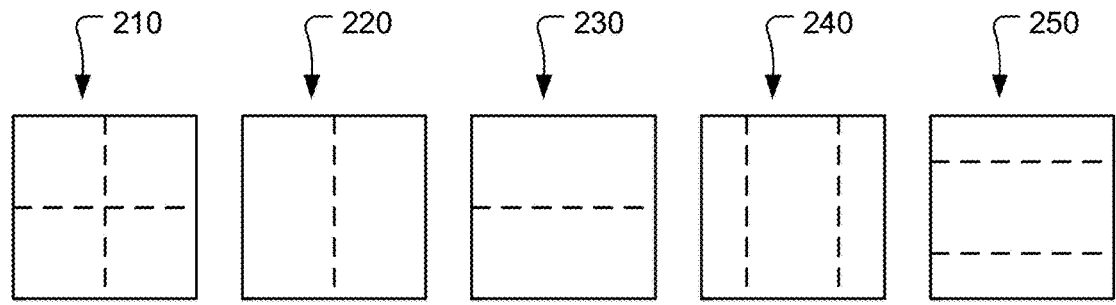
FIG. 2 illustrates that a CU can be split into smaller CUs using one of the five split types (quad-tree partitioning, vertical binary tree partitioning, horizontal binary tree partitioning, vertical center-side triple-tree partitioning, and horizontal center-side triple-tree partitioning).
Figure 3:
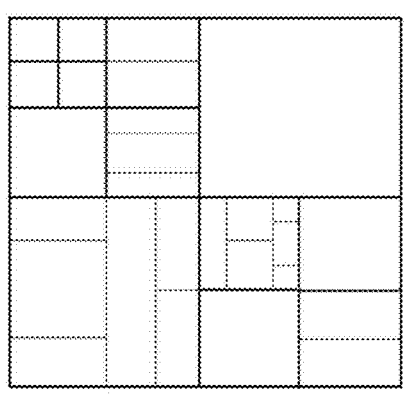
FIG. 3 illustrates an example of a CTU being recursively partitioned by QT with the nested MTT.
Figure 4:
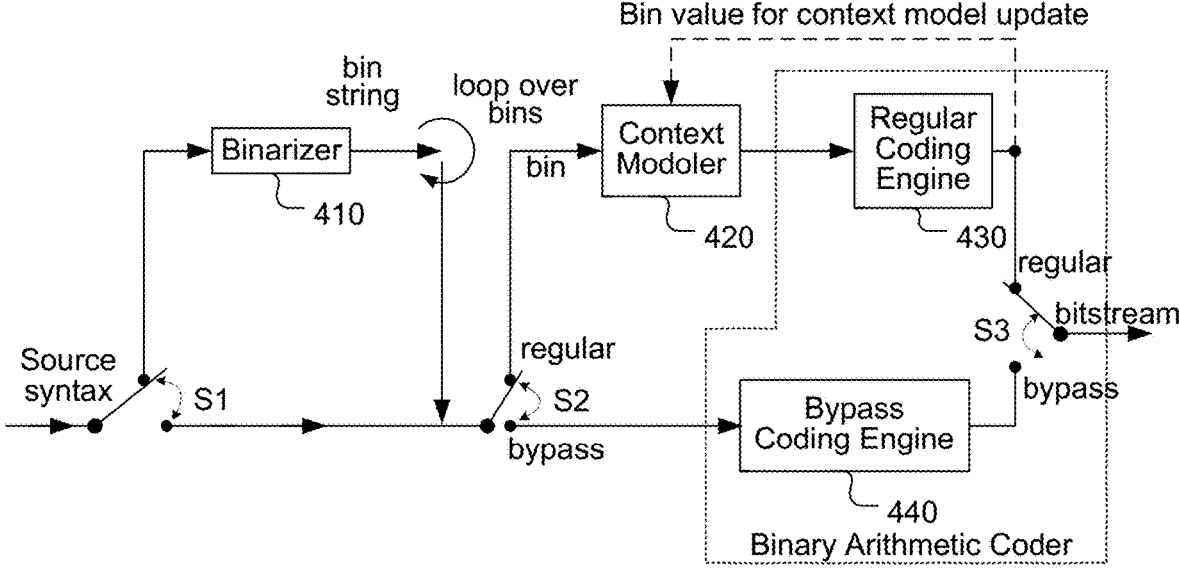
FIG. 4 illustrates an exemplary block diagram of the CABAC process.

In the present invention, entropy coding of the sign of a current coefficient may refer to entropy coding of the sign prediction bin of a current coefficient in any of the proposed methods mentioned above. The proposed aspects, methods and related embodiments can be implemented individually and jointly in an image and video coding system. Any of the foregoing proposed methods can be implemented in encoders and/or decoders. For example, any of the proposed methods can be implemented in a coefficient coding module of an encoder (e.g. Entropy Encoder 122 in FIG. 1A), and/or a coefficient coding module of a decoder (e.g. Entropy Decoder 140 in FIG. 1B). Alternatively, any of the proposed methods can be implemented as a circuit integrated to the coefficient coding module of the encoder and/or the coefficient coding module of the decoder.

Figure 7:
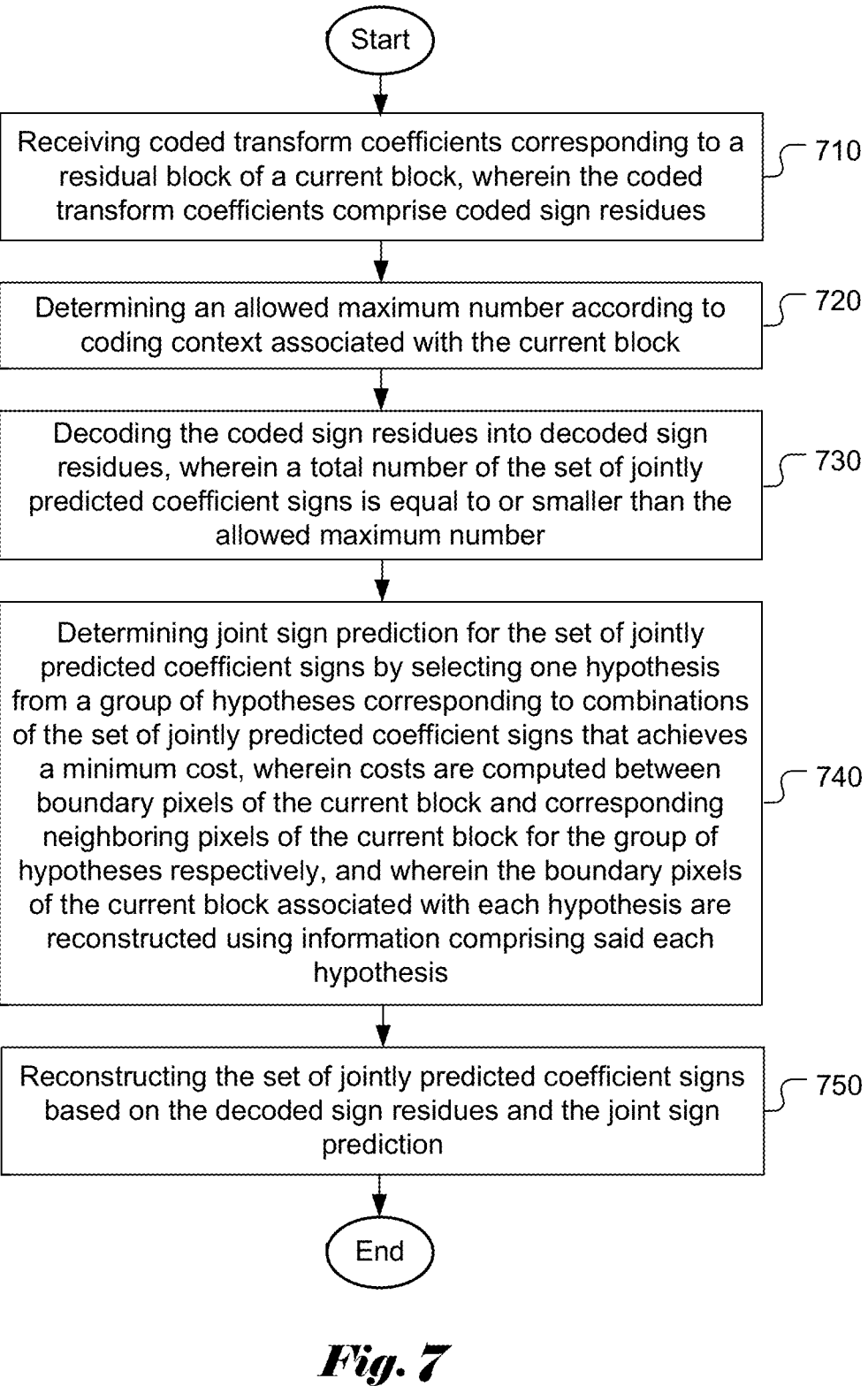
FIG. 7 illustrates a flowchart of an exemplary video decoding system that utilizes joint sign prediction according to an embodiment of the present invention.

FIG. 7 illustrates a flowchart of an exemplary video decoding system that utilizes joint sign prediction according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. A video decoder according to this method will receive coded transform coefficients corresponding to a residual block of a current block in step 710, where the coded transform coefficients comprise coded sign residues. An allowed maximum number is determined according to coding context associated with the current block in step 720. The coded sign residues are decoded into decoded sign residues in step 730, wherein a total number of the set of jointly predicted coefficient signs is equal to or smaller than the allowed maximum number. Joint sign prediction for the set of jointly predicted coefficient signs is determined by selecting one hypothesis from a group of hypotheses corresponding to combinations of the set of jointly predicted coefficient signs that achieves a minimum cost in step 740, wherein costs are computed between boundary pixels of the current block and corresponding neighboring pixels of the current block for the group of hypotheses respectively, and wherein the boundary pixels of the current block associated with each hypothesis are reconstructed using information comprising said each hypothesis. The set of jointly predicted coefficient signs is reconstructed based on the decoded sign residues and the joint sign prediction in step 750.

Figure 8:
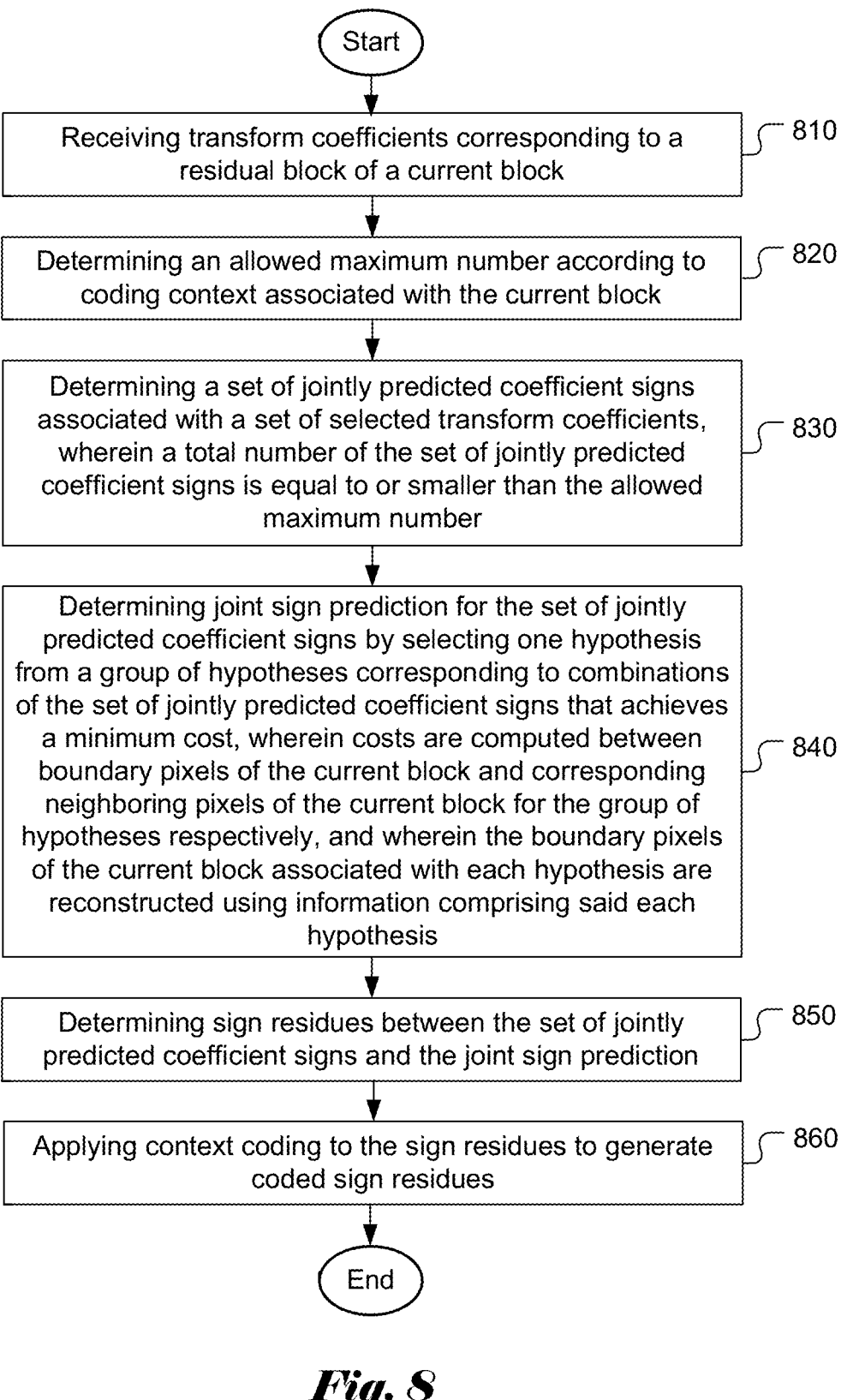
FIG. 8 illustrates a flowchart of an exemplary video encoding system that utilizes joint sign prediction according to an embodiment of the present invention.

FIG. 8 illustrates a flowchart of an exemplary video encoding system that utilizes joint sign prediction according to an embodiment of the present invention. A video encoder according to this method will receive transform coefficients corresponding to a residual block of a current block in step 810. An allowed maximum number is determined according to coding context associated with the current block in step 820. A set of jointly predicted coefficient signs associated with a set of selected transform coefficients is determined in step 830, wherein a total number of the set of jointly predicted coefficient signs is equal to or smaller than the allowed maximum number. Joint sign prediction for the set of jointly predicted coefficient signs is determined by selecting one hypothesis from a group of hypotheses corresponding to combinations of the set of jointly predicted coefficient signs that achieves a minimum cost in step 840, wherein costs are computed between boundary pixels of the current block and corresponding neighboring pixels of the current block for the group of hypotheses respectively, and wherein the boundary pixels of the current block associated with each hypothesis are reconstructed using information comprising said each hypothesis. Sign residues between the set of jointly predicted coefficient signs and the joint sign prediction are determined in step 850. Context coding is applied to the sign residues to generate coded sign residues in step 860.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video decoding, the method comprising:
   receiving coded transform coefficients corresponding to a residual block of a current block, wherein the coded transform coefficients comprise coded sign residues associated with a set of predicted coefficient signs;
   dividing the set of predicted coefficient signs into one or more subsets, wherein each subset includes one or more jointly predicted coefficient signs;
   decoding the coded sign residues into decoded sign residues for each subset;
   determining joint sign prediction for each subset of jointly predicted coefficient signs by selecting one hypothesis from a group of hypotheses corresponding to combinations of the subset of jointly predicted coefficient signs that achieves a minimum cost, wherein costs are computed between boundary pixels of the current block and corresponding neighboring pixels of the current block for the group of hypotheses respectively, and wherein the boundary pixels of the current block associated with each hypothesis are reconstructed using information comprising said each hypothesis; and
   reconstructing the set of predicted coefficient signs based on the decoded sign residues and the joint sign prediction for each subset.

2. The method of claim 1, wherein one or more syntax elements for deriving an allowed maximum number for the set of predicted coefficient signs are parsed from one or more high-level parameter sets.

3. The method of claim 2, wherein said one or more high-level parameter sets comprise a sequence parameter set (SPS), a picture parameter set (PPS), a picture header, a slice header, or a combination thereof.

4. The method of claim 2, wherein the allowed maximum number is determined depending on block size of the current block.

5. The method of claim 4, wherein the allowed maximum number is less than or equal to 4 when the block size is equal to 4×4.

6. The method of claim 2, wherein the allowed maximum number is determined depending on transform type of the current block.

7. The method of claim 1, wherein bins for the coded sign residues associated with the set of predicted coefficient signs are entropy coded in a residual coding process for entropy coding of the current block.

8. The method of claim 7, wherein the residual coding process further comprises a subblock sign coding pass for entropy coding the set of predicted coefficient signs from one or more subblocks in a top-left region of the current block after one or more sub-block coding passes for entropy coding of absolute values of transform coefficient levels of said one or more subblocks.

9. The method of claim 1, wherein the costs are computed between boundary pixels of the current block and corresponding neighboring pixels of the current block on a top boundary of the current block only or on a left boundary of the current block only.

10. The method of claim 9, wherein selection between the top boundary of the current block and the left boundary of the current block depends on selected Intra prediction direction of the current block.

11. An apparatus of video decoding, the apparatus comprising one or more electronic circuits or processors arranged to:

receiving coded transform coefficients corresponding to a residual block of a current block, wherein the coded transform coefficients comprise coded sign residues associated with a set of predicted coefficient signs;
dividing the set of predicted coefficient signs into one or more subsets, wherein each subset includes one or more jointly predicted coefficient signs;
decoding the coded sign residues into decoded sign residues for each subset;
determining joint sign prediction for each subset of jointly predicted coefficient signs by selecting one hypothesis from a group of hypotheses corresponding to combinations of the subset of jointly predicted coefficient signs that achieves a minimum cost, wherein costs are computed between boundary pixels of the current block and corresponding neighboring pixels of the current block for the group of hypotheses respectively, and wherein the boundary pixels of the current block associated with each hypothesis are reconstructed using information comprising said each hypothesis; and
reconstructing the set of predicted coefficient signs based on the decoded sign residues and the joint sign prediction for each subset.

12. A method of video encoding, the method comprising:
receiving transform coefficients corresponding to a residual block of a current block;
determining a set of predicted coefficient signs associated with a set of selected transform coefficients;
dividing the set of predicted coefficient signs into one or more subsets, wherein each subset includes one or more jointly predicted coefficient signs;
determining joint sign prediction for each subset of jointly predicted coefficient signs by selecting one hypothesis from a group of hypotheses corresponding to combinations of the subset of jointly predicted coefficient signs that achieves a minimum cost, wherein costs are computed between boundary pixels of the current block and corresponding neighboring pixels of the current block for the group of hypotheses respectively, and wherein the boundary pixels of the current block associated with each hypothesis are reconstructed using information comprising said each hypothesis;
determining sign residues between the set of predicted coefficient signs and the joint sign prediction for each subset; and
applying context coding to the sign residues to generate coded sign residues for each subset.

13. The method of claim 12, further comprises signaling one or more syntax elements for deriving an allowed maximum number for the set of predicted coefficient signs.

14. The method of claim 12, wherein the coding context corresponds to block size of the current block.

15. The method of claim 12, wherein bins for the coded sign residues associated with the set of predicted coefficient signs are entropy coded in a residual coding process for entropy coding of the current block.

16. The method of claim 15, wherein the residual coding process further comprises a subblock sign coding pass for entropy coding the set of predicted coefficient signs from one or more subblocks in a top-left region of the current block after one or more sub-block coding passes for entropy coding of absolute values of transform coefficient levels of said one or more subblocks.

17. The method of claim 12, wherein the costs are computed between boundary pixels of the current block and corresponding neighboring pixels of the current block on a top boundary of the current block only or on a left boundary of the current block only.

18. The method of claim 17, wherein selection between the top boundary of the current block and the left boundary of the current block depends on selected Intra prediction direction of the current block.

\* \* \* \* \*